United States Patent [19]
Robin

[11] 4,103,426
[45] Aug. 1, 1978

[54] APPARATUS FOR CONVERTING A MEASURING TAPE TO A COMPASS

[76] Inventor: Rollin Robin, 17815 Valley Vista Blvd., Encino, Calif. 91316

[21] Appl. No.: 825,930

[22] Filed: Aug. 19, 1977

[51] Int. Cl.² .............................................. B43L 9/04
[52] U.S. Cl. ........................................ 33/27 C; 33/138
[58] Field of Search ................ 33/27 C, 138, 137, 189

[56] References Cited
U.S. PATENT DOCUMENTS

| | | | |
|---|---|---|---|
| 1,246,925 | 11/1917 | Hunt | 33/27 C |
| 1,986,551 | 1/1935 | Anderson | 33/27 C |
| 2,581,858 | 1/1952 | Hilt et al. | 33/27 C |
| 2,976,614 | 3/1961 | Matuszewski et al. | 33/27 C |
| 3,120,059 | 2/1964 | Quenot | 33/27 C |
| 3,577,641 | 5/1971 | Smith | 33/27 C |
| 3,744,134 | 7/1973 | Zima | 33/138 |

FOREIGN PATENT DOCUMENTS

| | | | |
|---|---|---|---|
| 684,493 | 3/1965 | Italy | 33/27 C |

Primary Examiner—Harry N. Haroian

[57] ABSTRACT

A first element may be mounted on the housing or casing of a measuring tape and a second element may be mounted on the end of the tape itself. The first element comprises a pair of pivotally attached devices, one of which is fixed to the housing. The rotatable portion of the first element includes a tape-receiving slot and a center point. When the tape is positioned in the tape-receiving slot, the center point will be located so as to fixably locate the housing at the center of a circle to be drawn. That portion of the first element fixed to the measuring tape housing includes a storage sheath for the center point. The second element is a carriage, mounted on the outer end of the tape to grip the tape at the usual holding means. The carriage includes a bore for receiving a pencil or scriber. A wedge slidably mounted in the carriage cooperates with one edge of the bore to releasably lock a marking device in place.

8 Claims, 4 Drawing Figures

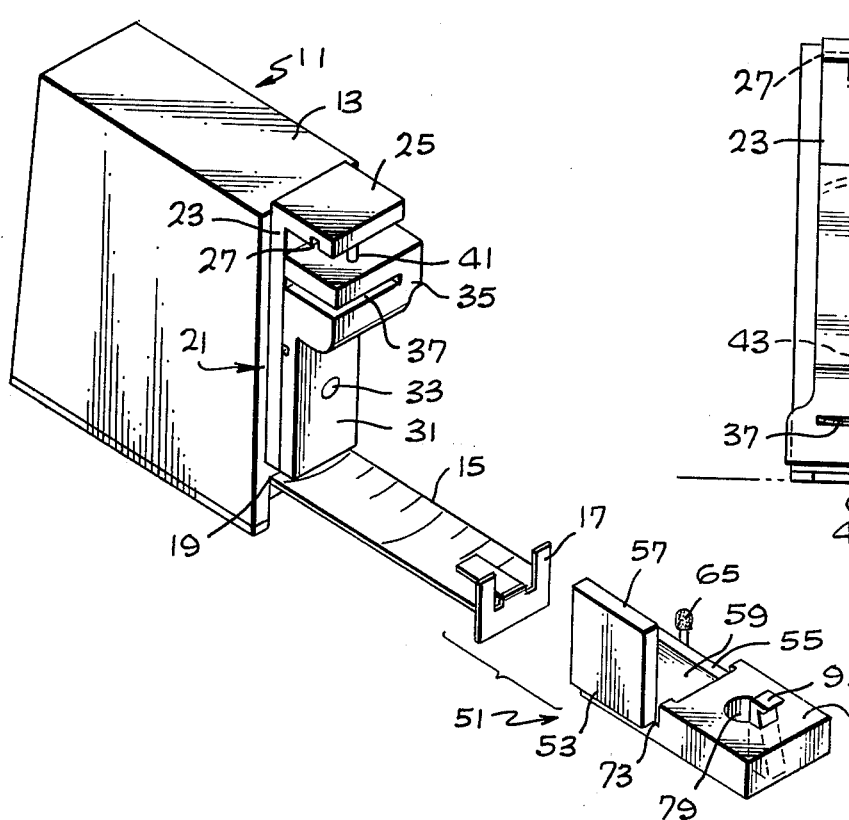
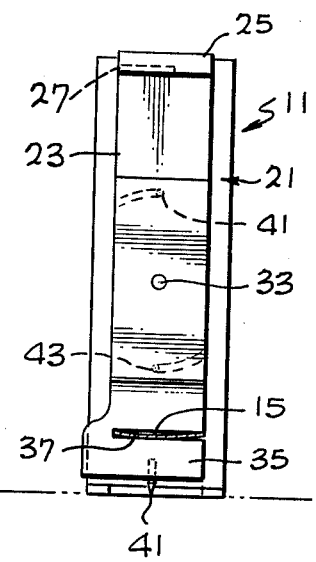
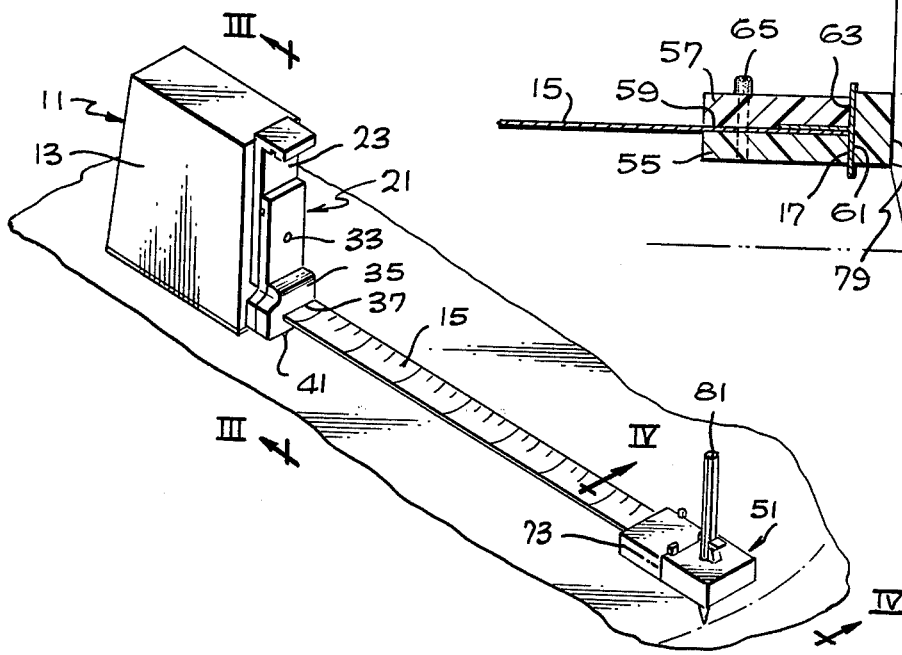
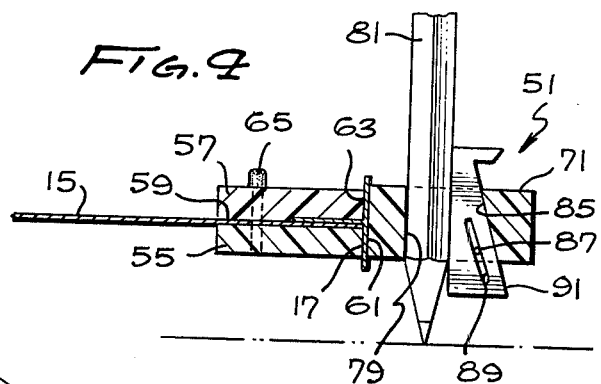

APPARATUS FOR CONVERTING A MEASURING TAPE TO A COMPASS

BACKGROUND OF THE INVENTION AND PRIOR ART STATEMENT

There are many instances in which it is necessary to draw a circle or an arc of a circle with a radius larger than that normally allowed by a standard compass or divider. In such cases, it has been necessary to either provide a special tool so that the desired radius can be obtained, or else to modify some existing tool for that purpose. For example, several years ago it was possible to drill small holes at predetermined locations in a standard carpenter's folding rule. A nail could then be passed through one of the holes to act as a center point. A pencil or other scribing device passed through a second hole could then be moved to form the desired arc.

Over the course of years, however, the folding rule has generally been replaced by the more convenient and smaller measuring tape. Such tapes normally utilize a housing enclosed on all sides and having a slit in one wall through which a tape may be withdrawn temporarily to take a measurement. The end of the tape is usually provided with a holder to facilitate taking an outside measurement by one person alone.

In recent years, the tapes used with such measuring devices have been provided with a uniform convex configuration throughout the length thereof. This configuration imparts characteristics which facilitate the coiling of the tape within the housing, as well as strengthening of the tape when it is pulled from the housing.

As such measuring tapes became more readily available, several proposals have been made for adaptation of those tapes for use as compasses. Examples of such proposals might be found, by way of example, in U.S. Pat. Nos. 2,804,688; 3,120,059; 3,526,964; and 3,577,641.

Each of the devices depicted in those four patents has disclosed a measuring tape in which the housing is constructed during its initial manufacture in such a manner as to allow a user to draw or scribe a circle about a fixed point. In each case, the fixed point is mounted on or within the housing of the measuring tape by means of structure developed during the initial production of the device.

On the other hand, there have been some attempts to develop structure which could be added to a standard measuring tape in order to convert such a tape to a device which would scribe arcs of circles. Such devices have been shown in U.S. Pat. Nos. 2,651,843 and 3,063,157. However, the former patent requires use of two clips which may be temporarily positioned at spaced locations on a measuring tape. Thus, when it is desired to retract the tape, at least one of the clips must be removed and stored elsewhere.

The latter patent, on the other hand, discloses structure which may be temporarily mounted on the bottom of a measuring tape case or housing. The structure includes a selectively movable arm which forms a pivot point when the arm is swung to an operative position. However, the structure into which the casing is placed thus alters the effective length of the bottom of the housing. Stated another way, the housing dimension between the tape withdrawal slot and the opposite housing wall is thus increased.

In many cases, the distance between the measuring tape slot in one wall of the housing and the opposite wall of the housing is precisely determined during manufacture so that the housing may be used in coordination with the tape in order to facilitate the measurement of an inside dimension. Consequently, when any structure alters the position of the back end of the case, relative to the tape slot, that alteration reduces the utility of the case and that utility can only be restored by removal of the altering structure.

SUMMARY OF THE INVENTION

The present invention relates to an apparatus which may be installed, either temporarily or permanently, on a common measuring tape to facilitate use of that measuring tape as a compass. More specifically, the invention relates to structure which may be installed by the owner of the measuring tape at his own discretion and without requiring the installation or production of any particular structure by the manufacturer or the measuring tape.

In its presently preferred embodiment, the device comprises a pair of elements. One element may be mounted on the measuring tape housing. A portion thereof may be selectively rotatable, relative to a fixed pivot point on the housing to an operative position. In the operative position, a center point may be located to cooperate with the work piece and the tape itself may be firmly gripped in order to prevent inadvertent extension or retraction thereof during the circle drawing operation.

A second element of the presently preferred embodiment may comprise a carriage which can be releasably mounted on the end of the measuring tape. The carriage may include a thru-bore for receiving a marking device such as a pencil, scribe, etc. If desired, a device may be formed in the carriage for locking the marking device in the bore. Such a locking device may comprise a slidable wedge having one component of motion which is parallel to the axis of the bore and a second component of motion which is generally radial, relative to the bore. Thus, the wedge may be moved into the bore to lock the marking device in place.

In any event, upon review of the following detailed description, taken together with the accompanying drawing, those skilled in the art quickly realize that the present invention is merely exemplified and not limited by this presently preferred embodiment.

BRIEF DESCRIPTION OF THE DRAWING

FIG. 1 comprises a perspective illustration of a measuring tape upon which a preferred embodiment of the present invention may be employed for describing the arc of a circle about a center point;

FIG. 2 comprises an enlarged perspective view of the device shown in FIG. 1, depicting the elements in selectively alternate positions;

FIG. 3 comprises an end view, partly in section, of the device shown in FIG. 1, as seen along the line III—III; and FIG. 4 comprises a side sectional view of one portion of the device shown in FIG. 1, as seen along the line IV—IV.

DETAILED DESCRIPTION

As shown in the figures the present invention relates to, but does not necessarily include, a measuring tape 11 including a housing 13 of any desired configuration and an elongated tape 15 having indicia thereon at predetermined locations to facilitate measuring. As shown particularly in FIGS. 2 and 4, such elongated tapes often may include a holding means 17 adjacent the end thereof. The holding means 17, in the case of most measuring tapes currently available, serves to grip the ends of an item to be measured so that the user can move away a distance necessary to measure an outside dimension of the item while the end of the tape is held in fixed position at one end of the measurement. Also, such holding means 17 are often used to prevent the tape from being irretrievably retracted into the housing 13 through a slot 19 through which it may be withdrawn. In other words, the holding means contacts the wall of the housing when the tape is retracted. Then, when the user wants to pull it out again, he can merely grasp the holding means and withdraw the tape.

As previously stated, the present invention may be employed with any desired measuring tape, regardless of its particular configuration, so long as a first element 21 may be suitably affixed to the housing. As shown in the drawings, one form of the first element may comprise a base plate 23 which may be fastened to the housing by any suitable means, such as glue, etc. If desired, the base plate 23 may include a flange 25 at one end thereof into which a groove 27 may be formed for a purpose to be described.

A pivot plate 31 may be mounted on the base plate 23 by any suitable means, such as a pivot pin or rivet 33. Near one end of the pivot plate 31, an enlarged or flanged section 35 may be formed. A slot 37 may be formed within the enlarged portion 35 so that, when the pivot plate is rotated from the position of FIG. 2 to that of FIGS. 1 and 3, the elongated tape 15 will be passed into and through the slot as illustrated.

Preferably, slot 37 may be relatively thin. Consequently, if the tape 15 is formed in the usual concave cross-sectional configuration, that portion of the tape within the slot 37 will be slightly deformed or flattened out. As a result, the tape will effectively become locked within the slot at the position selected by the user and it will require a fairly great force to alter the tape extension.

Also formed within the enlarged section 35 may be a center point 41 which, when the pivot plate is rotated to the operative position shown in FIG. 3, will extend below the lower surface of the housing 13.

When the operator desires to form a circle of an arc of a circle, he need only pull out the measuring tape until the graduation for the desired radius is even with the end of the housing 13 adjacent slot 19. He can then pivot the plate 31 from the position of FIG. 2 to the position of FIG. 3, moving slot 37 over the tape 15. This action will cause a deformation of that portion of the tape within the slot, locking the tape in position.

If desired to positively lock the pivot plate relative to the base plate 23, any suitable means may be employed, such as depressions 42 formed in one of the plates and an enlarged extension or knob 43 formed in the other plate. Thus, in the opposite positions of pivoting of the plate 31, the depressions and knob will cooperate to prevent rotation until the user desires to pivot the plate 31 and exerts sufficient force to overcome the detent gripping of the knob and depressions. Of course, those skilled in the art will realize that the knob could be formed in either plate and the depression in the other; alternatively, a single depression might be formed in one of the plates and a pair of knobs formed in the other.

In any event, the use of this or any such structure may be employed, if desired, to aid in retaining the pivot plate 31 in either the position shown in FIG. 3 or that shown in FIG. 2.

With respect to the illustration of FIG. 2, it can be seen that the slot 27 which may be formed in the flange 25 may be employed to sheath the sharp end of the center point 41 when the plate is rotated to the position illustrated in FIG. 2. In other words, when the apparatus is not being employed as a compass, the center point can be pivoted to a position such that an operator cannot be injured and a work piece cannot be damaged.

It will be noted that the structure described thus far does not alter the relationship, i.e., distance between the outer edge of slot 19 through which the tape 15 is withdrawn and the far end or edge of the housing 13. Consequently, the structure comprising the first element 21 of the preferred embodiment will not impair the usefulness of a tape measure when an inside dimension is measured, utilizing the distance between the holder 17 and the far end of the housing 13.

When it is desired to draw or scribe a circle, a second element 51, generally described as a carriage, may be mounted on the outer end of the tape 15 so as to grip the holder 17 in fixed relationship. In this preferred embodiment, the carriage may comprise a holding or gripping section 53 including a bottom portion 55 and a top or cover portion 57. Preferably, the bottom and top portions may be hinged together at 73, and formed so as to closely abut one another at the opposite end of the carriage, but include a slot 59 therebetween, when the cover is closed, suitable for receiving the end of the tape measure, including any rivets therein which may be employed to mount the holder on the end of the tape. Thus, when the carriage 51 is to be mounted on the end of the tape, the holder 17 may be located within a vertical slot 61 adjacent one end of the bottom portion 55 of the housing 53 and the top 57 of the housing closed against the tape, allowing the upper flange or ears of the holder, if any, to extend through a similar vertical slot 63. A latching or clasp member 65 may be attached to one of the top or the bottom portion. If, preferably, the latch member 65 is selected so as to have the characteristic of slight flexibility, when the cover 57 is closed against the bottom portion 55, the latch 65 will hold the cover closed and prevent inadvertent removal of the carriage 51 from the end of the tape.

There may be formed, integral with the bottom portion 59 of the carriage 51, an extension 71. The extension may serve to form one edge of the slot 61. Thus, the top portion of the housing 57 may be a separate structural element, joined to the bottom portion by any suitable means such as the flexible hinge 73 previously discussed.

Within the extension 71, a bore 79 may be provided through which a pencil 80 or other suitable marking or scribing device may be passed. Preferably, the axis of the bore 79 may be spaced from the slot 61 a distance which is substantially identical to the spacing between the center point 51 and the outer edge of the tape slot 19. Thus, when the user pulls the tape out so that the selective indicia is even with the outer edge of the slot 19, the pencil 81 and the center point 41 will be spaced exactly that distance apart.

In some cases, it may be necessary to provide structure to lock the pencil 81 within the bore 79. For this purpose, a wedge-shaped slot 85 may be provided in the extension 71 so as to be in communication with the bore 79 through a portion of the wall of the latter. A pin 87 may be passed through the slot 85 substantially perpendicular thereto so as to slidably cooperate with a slot 89 in a movable wedging or gripping member 91. Thus, when a pencil is passed through the bore 79, the user can push the wedge 91 upwardly and lock the pencil in place. Of course, if desired, the wedge 91 and slot 85 could be reoriented so that the wedge may be pushed downwardly instead of upwardly to accomplish this result.

If desired, extension 71 may be formed so that the outer edge thereof is exactly 1 inch from the slot 61. Accordingly, when the carriage 51 is mounted on the end of the tape, it lengthens the tape by 1 inch and need not be removed in order to measure an inside distance. On the other hand, when it is desired to measure an outside distance, the carriage 51 also need not be moved since, if the dimensions are proper, the tips of the holder 17 will extend beyond the ends of the slot 61 and 63, as illustrated in FIG. 4. Thus, it is only in an unusual situation that the carriage 51 will need to be removed from the end of the tape.

Having now reviewed this preferred embodiment, those skilled in the art will be fully aware that the present invention may be employed in a wide variety of structures, many of which may not even resemble that depicted here. Nevertheless, those structures shall be considered to employ the spirit and concept of the present invention as it is defined in the following claims.

I claim:

1. A compass comprising
 a measuring tape including
  a housing,
  an elongated tape extensible from said housing, and
  a holding means on the end of said tape extending out of said housing;
 means for pivotally supporting said housing in a fixed position including
  base means mounted on said housing,
  pivot means pivotally mounted on said base means and having
   means for selectively receiving and holding said elongated tape within said pivot means; and
   center point means fixedly mounted on said pivot means and extensible beyond one edge of said housing when said pivot means is moved to a fixed position relative to said base means; and
 means for mounting a marking device adjacent said holding means comprising
  carriage means including
   means for mounting said carriage means on said tape near said holding means and
   means for releasably holding a marking device at a predetermined distance from said holding means.

2. The compass of claim 1 wherein
said base means comprises
 flange means adjacent one end thereof and
 means in said flange means for selectively receiving and covering said center point means.

3. The compass of claim 1 wherein
said receiving and holding means comprises means for temporarily deforming said elongated tape.

4. Apparatus for converting a measuring tape, including a housing and an elongated tape, having a holding means, the tape being withdrawable from one end of said housing, into a compass of variable radius comprising
 first means for selectively fixedly but pivotally locating such a housing including
  pivot plate means rotatably mounted upon such a housing,
  center point means fixed near one end of said pivot plate means, and
  means on said pivot plate means for releasably gripping such an elongated tape extending out of one end of such a housing and so configured as to utilize spring characteristics inherent in such a tape for such gripping; and
 second means for selectively fixedly retaining a marking instrument at a selected distance from said center point means comprising
  carriage means including
   means for locating said carriage means relative to a holding means on the end of such an elongated tape, and
   means for locating a marking means at a predetermined position relative to said locating means.

5. The apparatus of claim 4 wherein
said marking means locating means includes means for selectively gripping such a marking means within said locating means.

6. The apparatus of claim 4 wherein
said first means further includes
 base means mountable on the end of a housing through which an elongated tape may be withdrawn, said pivot plate means being pivotally supported on said base means, and said base means including
  means for shielding said center point at one relative pivotal position of said base means and said plate means.

7. The apparatus of claim 6 wherein
said gripping means includes
 slot means on said pivot plate means for releasably gripping an elongated tape passed therethrough, said slot means having a configuration such that an elongated tape passed therethrough is temporarily deformed therein.

8. The apparatus of claim 7 wherein
said marking means locating means includes wedge means for selectively gripping a marking means within said locating means.

* * * * *